(12) United States Patent
Yaung et al.

(10) Patent No.: US 6,446,069 B1
(45) Date of Patent: Sep. 3, 2002

(54) ACCESS CONTROL SYSTEM FOR A MULTIMEDIA DATASTORE

(75) Inventors: Alan Tsu-I Yaung, San Jose; Jy-Jine James Lin, Cupertino, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/398,374

(22) Filed: Sep. 17, 1999

(51) Int. Cl.[7] .............................................. G06F 17/30
(52) U.S. Cl. ........................... 707/9; 707/2; 707/104.1; 707/10
(58) Field of Search ............................. 707/2, 4, 10, 9, 707/104; 709/225, 226; 713/150, 165, 167, 200, 201

(56) References Cited

U.S. PATENT DOCUMENTS

| | | | |
|---|---|---|---|
| 5,335,346 A | 8/1994 | Fabbio | 711/163 |
| 5,437,027 A | 7/1995 | Bannon et al. | 707/103 R |
| 5,471,619 A | 11/1995 | Messina | 707/8 |
| 5,524,238 A | 6/1996 | Miller et al. | 707/4 |
| 5,649,185 A | 7/1997 | Antognini et al. | 707/9 |
| 5,664,189 A | 9/1997 | Wilcox et al. | 707/205 |
| 5,675,782 A | 10/1997 | Montague et al. | 713/201 |
| 5,680,452 A | 10/1997 | Shanton | 713/167 |
| 5,752,244 A | 5/1998 | Rose et al. | 707/5 |
| 5,752,247 A | 5/1998 | Henderson | 707/102 |
| 5,787,413 A | 7/1998 | Kauffman et al. | 707/2 |
| 5,787,427 A | 7/1998 | Benantar et al. | 345/749 |
| 5,870,080 A | 2/1999 | Burnett et al. | 345/163 |
| 6,035,399 A | 3/2000 | Klemba et al. | 713/200 |
| 6,104,392 A | 8/2000 | Shaw et al. | 345/749 |
| 6,289,382 B1 * | 9/2001 | Bowman-Amuah | 709/226 |
| 6,289,462 B1 * | 9/2001 | McNabb et al. | 713/201 |

FOREIGN PATENT DOCUMENTS

| | | | |
|---|---|---|---|
| EP | 881577 A2 | 12/1998 | G06F/12/02 |
| EP | 886212 A2 | 12/1998 | G06F/9/46 |
| JP | 10198593 | 7/1998 | G06F/12/00 |
| WO | WO 99/19797 A1 | 4/1999 | |

OTHER PUBLICATIONS

IBM Technical Disclosure Bulletin, "Distributing SOMObjects Using Distributed Computed Environment", vol. 39, No. 11, Nov. 1996, pp. 195–196.

IBM Technical Disclosure Bulletin, "Reusable Object Oriented Framework For Plug Compatible Applications", vol. 38 No. 3, Mar. 1995, pp. 567–573.

* cited by examiner

*Primary Examiner*—Diane D. Mizrahi

(57) ABSTRACT

A method, apparatus, and article of manufacture for a computer-implemented access control system. The access control system controls access by users to functions of an application program executed by a computer and connected to a multimedia datastore. Application privileges are defined to control access to functions of the application program which operate upon data items of the multimedia datastore. For the application program, one or more users are associated with one or more application privileges. Access by users to functions of the application program is restricted depending upon whether the user has been associated with the application privilege for the function. If the user has been associated with the application privilege, access to the function is granted, if not, access to the function is denied.

50 Claims, 5 Drawing Sheets

ACCESS CONTROL SYSTEM FOR A MULTIMEDIA DATASTORE

CROSS-REFERENCE TO RELATED APPLICATION

This application is related to the following co-pending and commonly-assigned patent application, now pending application Ser. No. 09/397,946, entitled, "OBJECT-ORIENTED FRAMEWORK FOR MANAGING ACCESS CONTROL IN A MULTIMEDIA DATABASE" filed on Sep. 17, 1999 by Alan T. Yaung, et al., which is incorporated by referenced herein.

BACKGROUND OF THE INVENTION

1. Field of the Invention

This invention relates in general to computer implemented database management systems, and more particularly, to an access control system for a datastore.

2. Description of Related Art

A datastore is a term used to refer to a generic data storage facility, such as a relational data base, flat-file, hierarchical data base, etc.

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate Information Systems (IS) organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "Meta data" needs to be created in addition by developers or librarians. The indexing information for multimedia information is often kept in "business like" databases separated from the physical object.

One type of multimedia datastore is a Digital Library (DL). In a digital library, the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc . . . can be used when appropriate.

The indexing information used for catalog searches in physical libraries is mostly what one can read on the covers of the books: authors name, title, publisher, ISBN , . . . enriched by other information created by librarians based on the content of the books (abstracts, subjects, keywords, . . . ). In digital libraries, the entire content of books, images, music, films, etc . . . are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

Object-Oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Along with better data management systems for multimedia datastores, such as a digital library, there is a need for improved access control to functions of an application program which operate upon data items within the multimedia datastore. The term access control generally refers to only allowing a user with the requisite privilege or right to access a requested function, while denying access to functions requested by users who do not have the requisite right or privilege.

In the domain of multimedia datastores, particularly, multimedia databases, access control to the multimedia datastore can be roughly divided into system level access control and application level access control. The former mainly deals with system related access control issues, such as read/write access for specific objects. The latter, on the contrary, deals with the access control that is specific to the application running on the top of the multimedia datastore. As multimedia database applications are becoming more complex, the need for sophisticated access to the underlying multimedia database has become very important. Unfortunately, the capability for application-specific access control within present multimedia datastores, is not well developed. In particular, access control to a multimedia datastore is still not easily implemented at the application program level.

Thus, there is a need in the art for improved access control to a multimedia datastore that solves the deficiencies mentioned above.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented access control system that controls access by users to functions of an application program executed by a computer and connected to a multimedia datastore.

In accordance with the present invention, application privileges are defined to control access to functions of an application program which operate upon data items of the multimedia datastore. For the application program, one or more users are associated with one or more application privileges. Access by users to functions of the application program is restricted depending upon whether the user has been associated with the application privilege for the function. If the user has been associated with the application privilege, access to the function is granted, if not, access to the function is denied.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
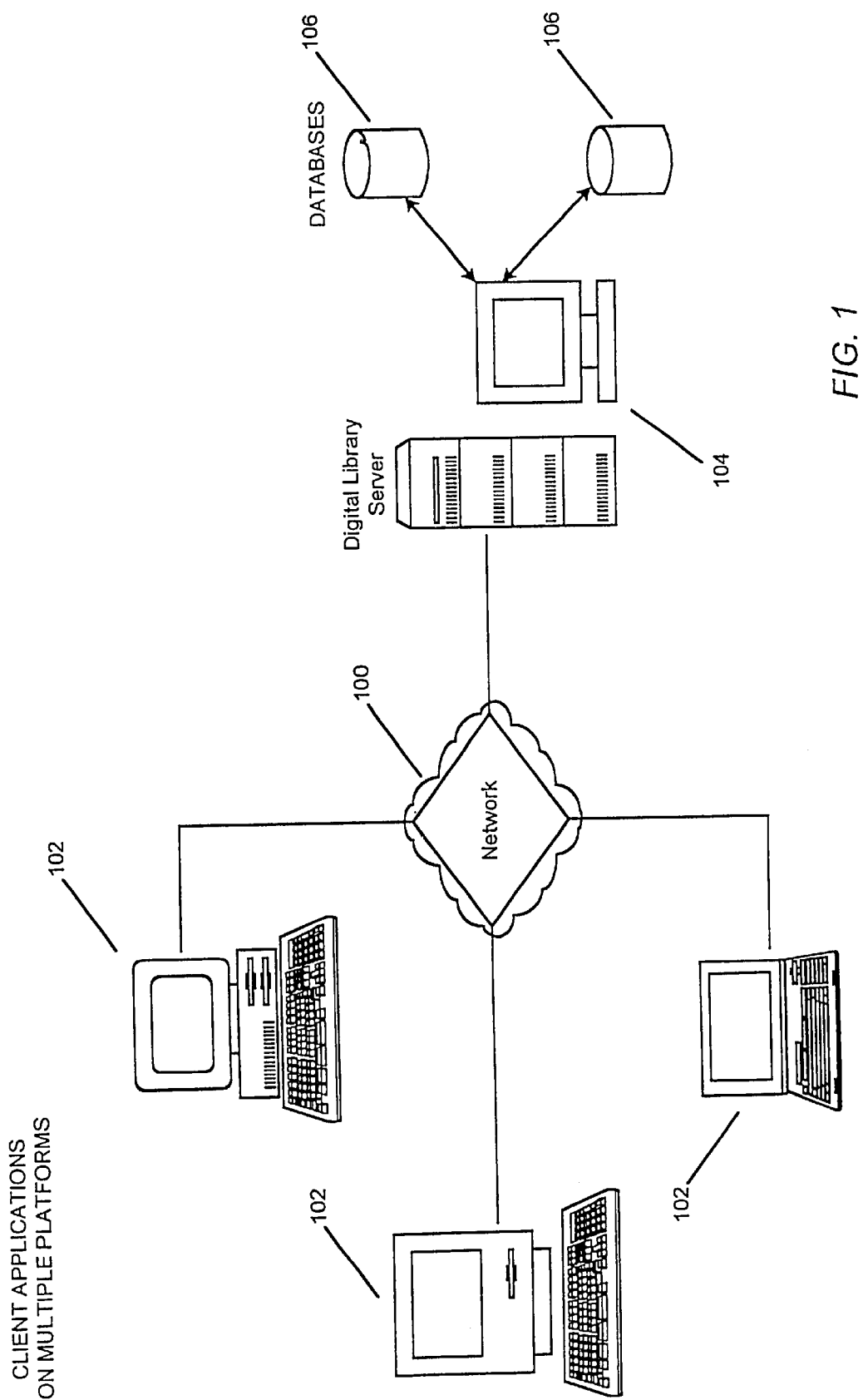
FIG. 1 schematically illustrates a hardware environment of a preferred embodiment of the present invention, and more particularly, illustrates a typical distributed computer system.

FIG. 1 schematically illustrates the hardware environment of a preferred embodiment of the present invention, and more particularly, illustrates atypical distributed computer system using the network 100 to connect client computers 102 executing client applications to a Digital Library server computer 104 executing software and other computer programs, and to connect the server system 104 to data sources 106. A Digital Library is a particular type of multimedia datastore. Further, a data source 106 may comprise, for example, a multi-media database. A typical combination of resources may include client computers 102 that are personal computers or workstations, and a Digital Library server computer 104 that is a personal computer, workstation, minicomputer, or mainframe. These systems are coupled to one another by various networks, including LANs, WANs, SNA networks, and the Internet.

A client computer 102 typically executes a client application and is coupled to a Digital Library server computer 104 executing server software. The client application program is typically a software program which can include, inter alia, multi-media based applications, e-mail applications, e-business applications, or workflow applications. The server software is typically a program such as IBM's Digital Library server software. The Digital Library server computer 104 also uses a data source interface and, possibly, other computer programs, for connecting to the data sources 106. The client computer 102 is bi-directionally coupled with the Digital Library server computer 104 over a line or via a wireless system. In turn, the Digital Library server computer 104 is bi-directionally coupled with data sources 106.

The data source interface may be connected to a Database Management System (DBMS), which supports access to a data source 106 by executing Relational Database Management System (RDBMS) software. The interface and DBMS may be located on the same server as the Digital Library server computer 104 or may be located on a separate machine. The data sources 106 may be geographically distributed.

Figure 2:
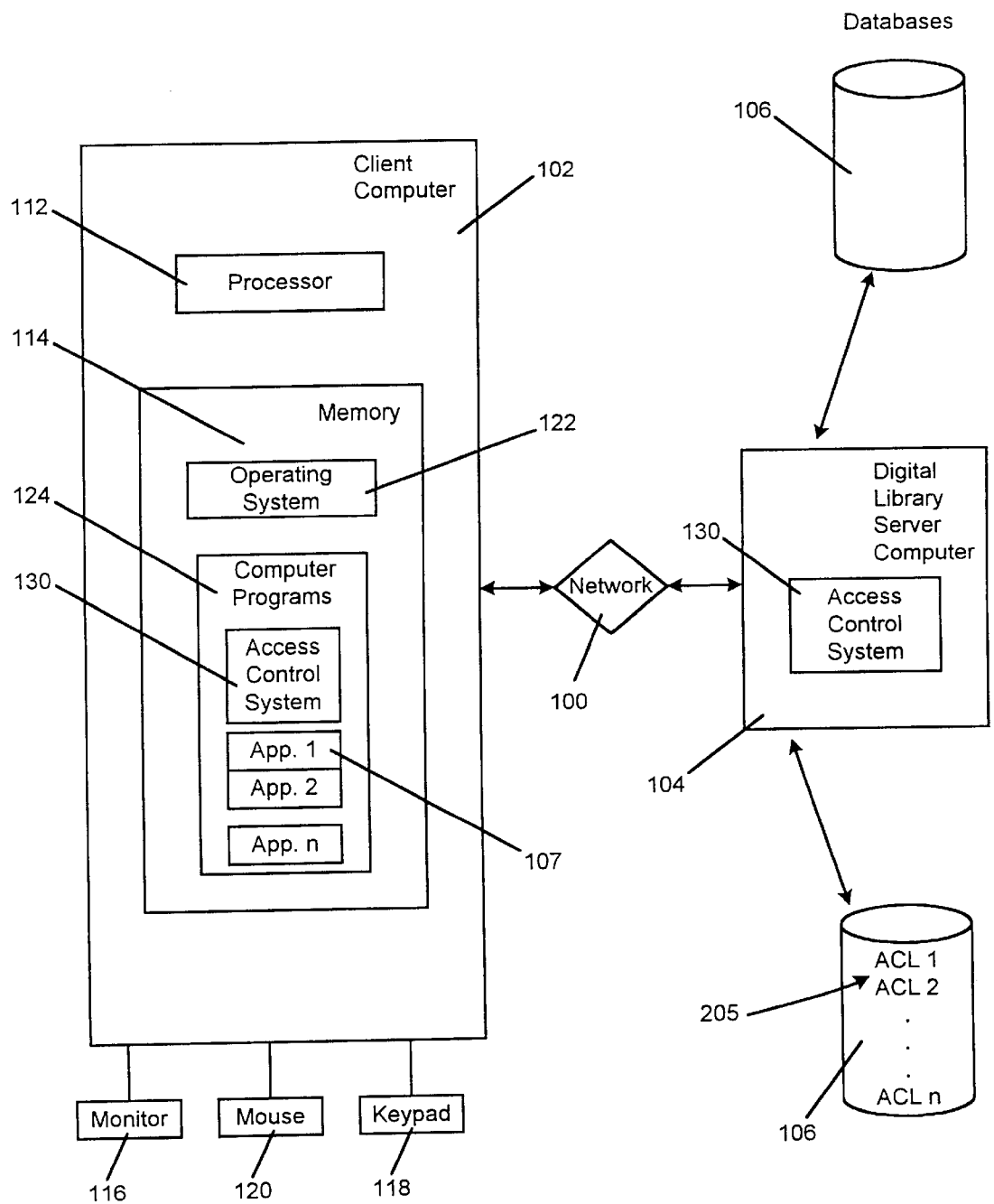
FIG. 2 schematically illustrates a hardware environment used to implement a preferred embodiment of the invention.

FIG. 2 is a hardware environment used to implement a preferred embodiment of the invention. The present invention is typically implemented in the client computer 102, however, it could also be implemented in the Digital Library server computer 104. Application programs 107 generally reside in the client computer 102. The client computer 102 may include, inter alia, a processor 112, memory 114 (e.g., Random Access Memory (RAM)), a monitor 116 (e.g., CRT, LCD display, etc.), a keypad 118, and a mouse 120. It is envisioned that attached to the client computer 102 may be other devices such as read only memory (ROM), data storage devices (e.g., hard, floppy, and/or CD-ROM disk drives, etc.), data communication equipment (e.g., modems, network interfaces, etc.), a video card, bus interface, printers, etc. Those skilled in the art will recognize that any combination of the above components, or any number of different components, peripherals, and other devices, may be used with either the client or Digital Library server computer 102 and 104. Furthermore, although these sub-components for a typical computer have been illustrated in FIG. 2 with reference to the client computer 102, for the purposes of clarity, it should be appreciated that the description of these sub-components apply to the Digital Library server computer 104 as well.

The access control system 130 of the present invention is generally implemented in the client computer 102 as one or more computer programs, which execute under the control of an operating system to perform the desired functions as described herein. However, it could also be implemented in the Digital Library server computer 104.

The computer programs are comprised of instructions which, when read and executed by the computer, cause the computer to perform the steps necessary to implement and/or use the present invention. Generally, the computer programs are tangibly embodied in and/or readable from a device, carrier, or media, such as memory, data storage devices, and/or a remote device coupled to the computer via data communications devices. Under control of the operating system, the computer programs may be loaded from the memory, data storage devices, and/or remote devices into the memory of the computer for use during actual operations.

Thus, the access control system 130 of the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIGS. 1 and 2 is not intended to limit the present invention. Indeed, those skilled in the art will recognize that other alternative system environments may be used without departing from the scope of the present invention.

Access Control System for a Digital Library

Due to the rapid growth in the use of digital libraries for storing and retrieving multi-media information, the development of application programs associated with the use of digital libraries has consequently been flourishing. However, security issues related to controlling access to certain types of information by users within a digital library have become increasingly important. Particularly, the issue of access control at the application level, for restricting or allowing users access to certain functions for the digital library, dependent upon their access rights or privileges, has been receiving growing attention recently. Unfortunately, previous attempts to address this issue in today's digital libraries have been either non-existent or critically deficient. Furthermore, it is to be understood that a function refers to a process, procedure, operation, or routine that may be performed by an application program to achieve a desired action or result.

Currently, digital libraries provide limited support for application-specific access control. For example, the design of the IBM DB2 Digital Library only allows an application developer to use a limited number of bits, in a privilege string, for the implementation of access control to the Digital Library within their application. Particularly, the IBM DB2 Digital Library design has the following issues:

1. Only 99 application-specific privilege bits can be used for access control, which may make it difficult for the Digital Library to sufficiently accommodate the access control needs of an application.

2. Low-level C based Application Program Interfaces (API'S) must be used to manipulate these application-specific privilege bits. Currently, the existing system administration tool of the Digital Library only handles system related privilege bits, not application-specific privilege bits. The lack of high-level functions to manipulate application-specific access control may discourage application developers from applying application-specific privilege bits into their programs to provide access control within their application.

3. There is always a possibility that the application-specific privilege bits defined in one privilege string may collide with bits defined in another privilege string. Unfortunately, all the privilege strings are sharing the same 99 bits for access control.

In accordance with the access control system 130 of the present invention, application privileges are typically defined by an application developer (but may also be defined by a system manager or a user) at the application level, to control the type of access to functions for the digital library. For an application program, one or more users are associated with one or more application privileges. Access by users to functions of the application program is restricted depending upon whether the user has been associated with the application privilege for the function. If the user has been associated with the application privilege, access to the function is granted, if not, access to the function is denied.

In a specific embodiment of the invention, to be discussed in more detail later, the invention utilizes: (1) an extensible application-specific access control model, and (2) an Object-Oriented Application Program Interface (API) design implementing the model. The extensible application-specific access control model allows each application program to define its privileges using an extensible application-specific privilege vector within the digital library. The extensible application-specific privilege vector allows the application developer to use as many bits as needed to define application privileges. Each privilege corresponds to a certain type of function to be performed with a pre-determined type of data item in the digital library. Only a user utilizing the application who is associated with the privilege can thereby gain access to the function and perform the function on the data item.

An advantage of the access control system 130 of the present invention is that the access control system defines an extensible application-specific privilege vector, i.e. a privilege vector utilizing as many bits as requested, that is definable by an application developer. In this way, the application developer can utilize as many privilege bits as necessary to fulfill their access control needs. Thus, the problem of having a pre-determined limited number of bits used for access control within a digital library is thereby obviated. Furthermore, the long-standing problem of the privilege bits colliding with one another, i.e. one application turning a privilege bit "on or off" resulting in a user of another application being incorrectly allowed or denied access to perform a function to a data item of the digital library is also solved. This is because each application defines its own application-specific privilege vector and therefore the bits of each vector are separate from one another and cannot "collide."

Further, the Object-Oriented Application Program Interface (API) design for the access control system 130 provides a useable set of functions for application program developers to easily write their own application-specific access control routines directly into their application. Thus, advantageously, an application program developer is able to easily write sensible digital library applications with sophisticated access control. This obviates the problem associated with prior attempts at access control, which utilized low-level C based Application Program Interfaces to manipulate these application-specific privilege bits. These low-level C based Application Program Interfaces have discouraged application developers from applying application-specific privilege bits into their applications to provide access control for their application.

Software developers will greatly benefit from the access control system of the present invention, in that they can easily develop and sell application programs with sophisticated access control to consumers who deal with sensitive or confidential information and who are desirous of software applications with sophisticated access control, such as: the government, defense companies, law firms, large companies, research-oriented companies, advertising agencies, etc. The access control system of the present invention is useable with a variety of different databases, digital libraries in general, and the IBM DB2 Digital Library in particular.

Figure 3:
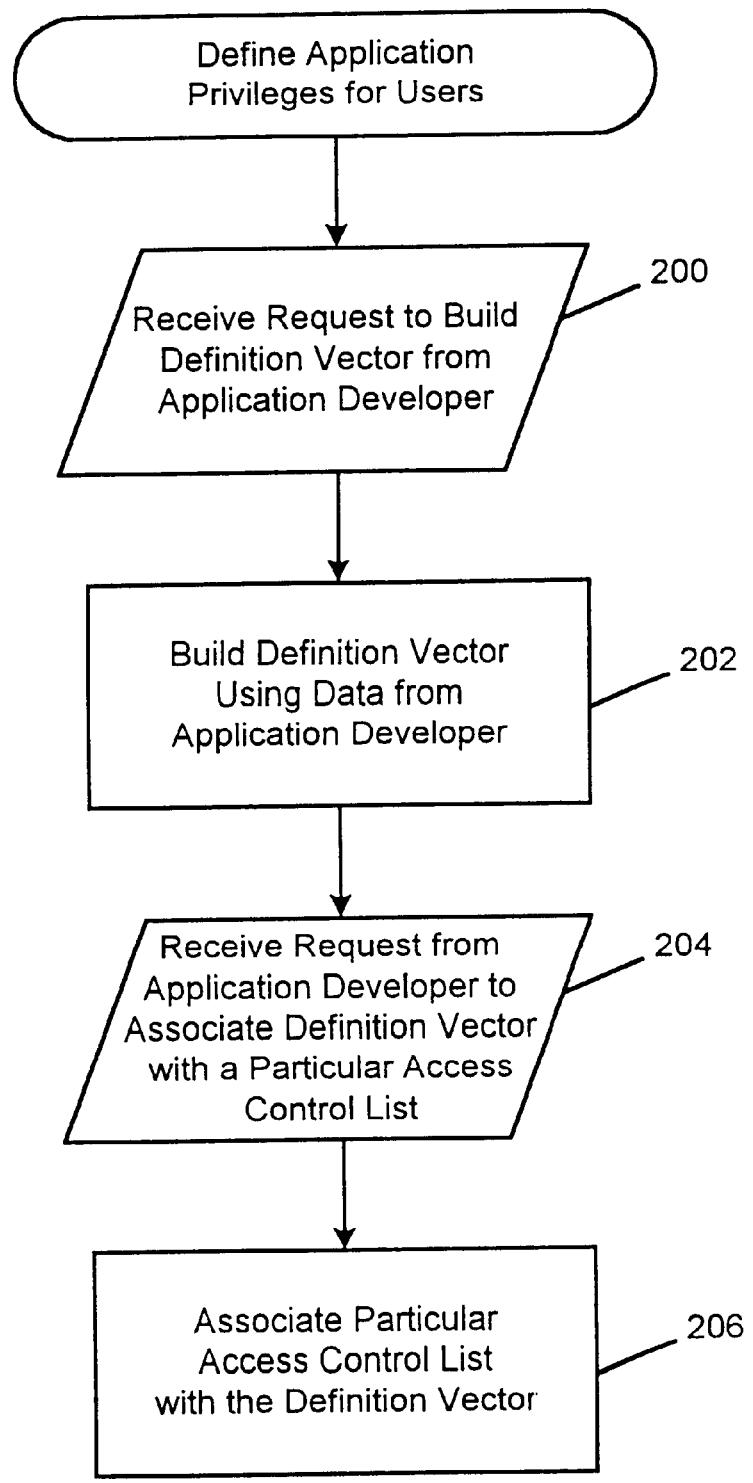
FIG. 3 is a flow diagram that illustrates the steps performed by an access control system to define application privileges for users and to associate those application privileges with a particular Access Control List.

FIG. 3 is a flow diagram illustrating the steps performed by the access control system 130 to define application privileges for users and to associate those application privileges with a particular Access Control List (ACL). In data block 200, the access control system 130 receives a request from the application developer to build a definition vector. Using the input data received from the application developer, in block 202, the access control system 130 builds the definition vector.

For example, the input data for the application-specific definition vector (DV) received in block 200 generally takes the form DV=<P1, P2, P3, . . . , Pn>, where Pi is a unique privilege (i.e., Pi=Pj, if and only if i=j). An application developer determines the extent of access control for the application program by defining this definition vector which is specific to each application. Advantageously, the access control system allows each application program to define its privileges using this application-specific definition vector. Each defined privilege corresponds to a certain type of function to be performed with a pre-determined type of data item in the digital library. As will be discussed, only a user utilizing the application who is associated with the privilege can thereby gain access to the function and perform the function on the data item.

In a preferred embodiment, such as an access control system 130 utilizing an application-specific access control model for use with the IBM DB2 Digital Library, the definition vector (DV) defines one or more application-specific privileges. For example, an application developer wanting to implement application-specific access control for his application may identify the following four privileges/functions:

MAIL (users are allowed to forward multimedia data via E-Mail integration);
VIDEO (users are allowed to render video data);
WORKFLOW (users are allowed to use workflow functions); and
CONFIDENTIAL (users are allowed to access confidential data);

as a definition vector, e.g. DV=<MAIL, VIDEO, WORKFLOW, CONFIDENTIAL>. In block 200, the access control system 130 receives the above request and data from the application developer to build a definition vector. As in block 202, the access control system 130 builds the definition vector with the pre-determined privilege names of the digital library as shown in the table below:

| Function | Privilege Name |
|---|---|
| MAIL | App_Priv_Mail |
| VIDEO | App_Priv_Video |
| WORKFLOW | App_Priv_Workflow |
| CONFIDENTIAL | App_Priv_Confidential |

The access control system then builds the definition vector DV=<App_Priv_Mail, App_Priv_Video, App_Priv_Workflow, App_Priv_Confidential>, for the above example privileges/functions.

Continuing with reference to FIG. 3, in block 204 the access control system 130 next receives a request from the application developer to associate the definition vector with a particular Access Control List (ACL) 205 of the digital library (FIG. 2). Typically, digital libraries contain pre-determined access control lists. For example, often access control lists are created by a system administrator to allow certain people based upon their position within a company (e.g. engineer, researcher, secretary, accountant, executive, etc.), to access certain types of functions and to perform those functions only upon particular types of data items in the digital library. Next, in block 206, the access control system 130 associates the particular access control list with the previously defined definition vector. The access control list is used to associate users and groups with the application-specific privileges previously defined in the definition vector creating an Associated Application-Specific Access Control List. For example, continuing with the previously defined definition vector (DV) and assuming a particular access control list, a typical Associated Application-Specific Access Control List, as may be generated by the access control system 130 of the present invention in conjunction with the IBM DB2 Digital Library is shown below.

| User/Group Name | Privilege Name |
|---|---|
| User1 | App_Priv_Mail |
| User1 | App_Priv_Workflow |
| User2 | App_Priv_Video |
| User2 | App_Priv_Confidential |
| Group1 (including User3, User4) | App_Priv_Mail |
| Group1 (including User3, User4) | App_Priv_Workflow |

This approach takes advantage of the existing System Administration tools of the IBM DB2 Digital Library for managing users, groups, and privileges and utilizes them for application-specific access control. Further, it provides seamless integration between the system-level access control and application-specific access control.

Figure 4:
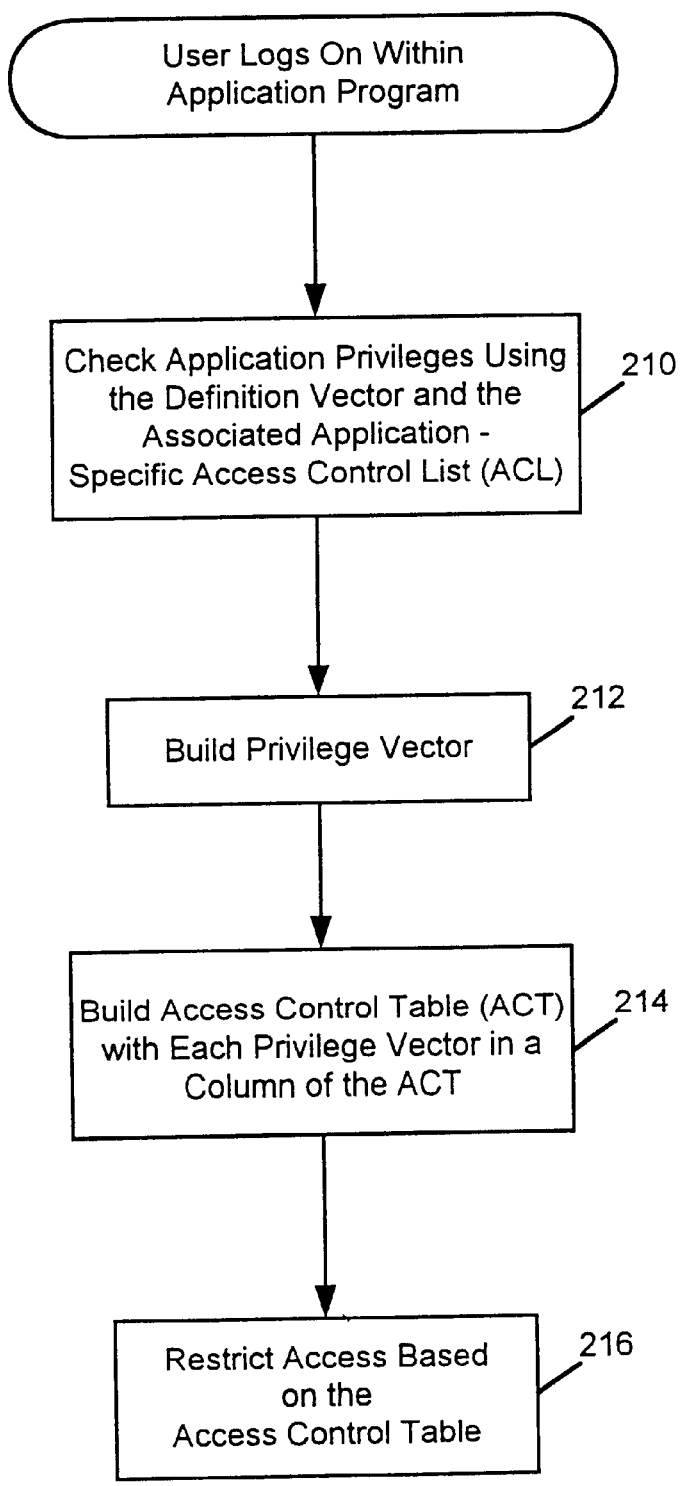
FIG. 4 is a flow diagram that illustrates the steps performed by the access control system when a user logs onto the digital library and the access control system checks application privileges to restrict user access.

FIG. 4 is a flow diagram that illustrates the steps performed by the access control system 130 when a user logs onto the digital library within the application program and the access control system checks application privileges to restrict user access. In block 210, the access control system 130 checks application privileges using the definition vector and the Associated Application-Specific Access Control List. In block 212, the access control system 130 builds a plurality of privilege vectors. After building the privilege vectors, block 214, the access control system 130 builds an Access Control Table (ACT) with each privilege vector in a column of the access control table indicating the application privileges for each user. The access control system 130, in conjunction with the application program, can then, as shown in block 216, restrict access by users to functions for the digital library depending upon whether privilege vector in the access control table indicates that the user has been associated with the application privilege for the function. If the privilege vector in the access control table indicates that the user has been associated with the application privilege for the function, access to the function is granted and a user can perform the desired function upon the data item in the digital library, if not, access to the function is denied and the user cannot perform the desired function upon the data item of the digital library.

Figure 5:
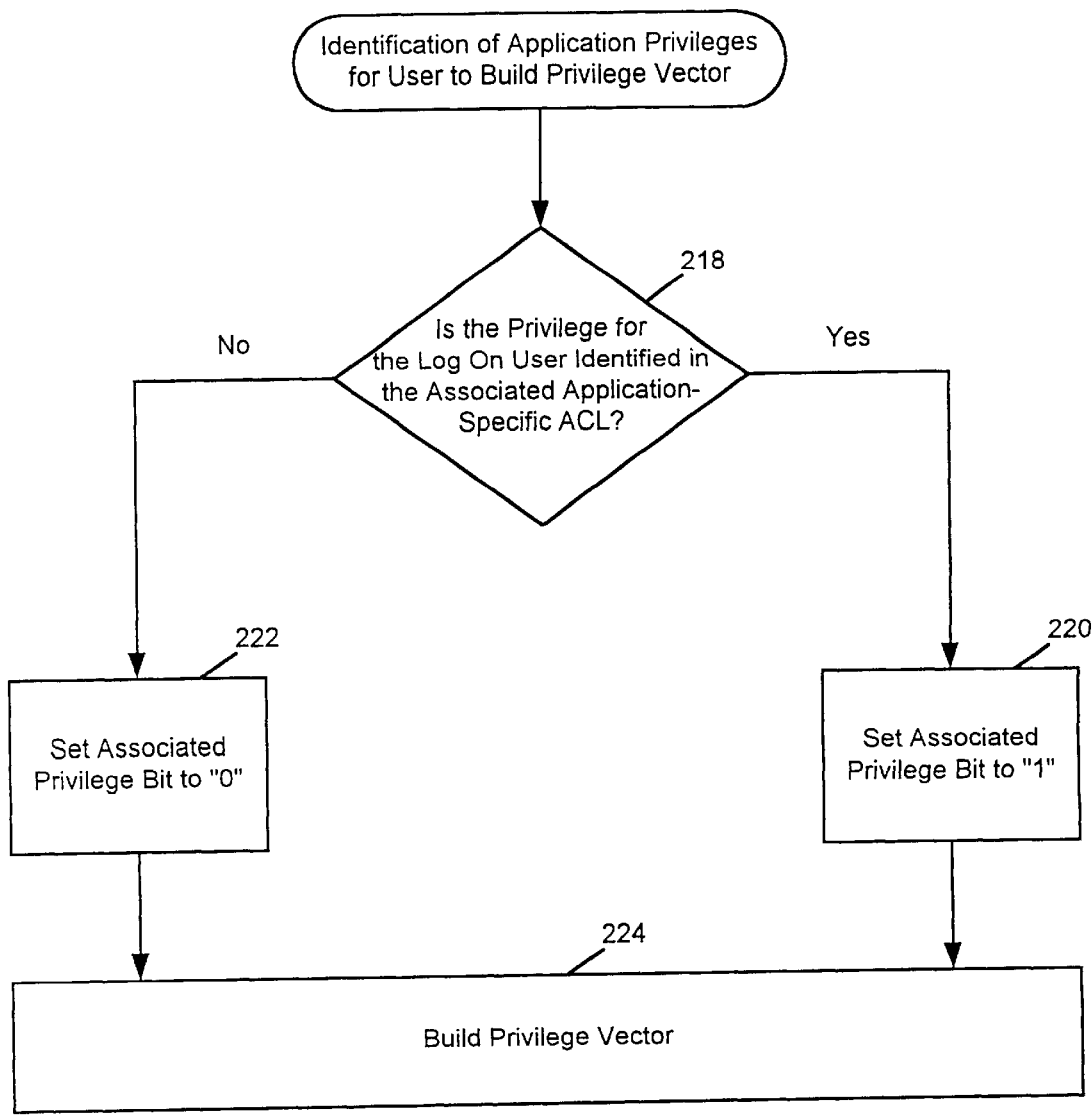
FIG. 5 is a flow diagram that illustrates the steps performed by the access control system in building a privilege vector for a user.

FIG. 5 is a flow diagram that illustrates the steps performed by the access control system 130 in building the privilege vector for a user. In block 218, after the user logs onto the digital library within the application program, the access control system 130 processes each row of the Associated Application-Specific Access Control List to determine whether the privilege for the log on user is identified in the Associated Application-Specific Access Control List. If the privilege is identified for the user, block 220, the access control system 130 sets an associated privilege bit to "1". If the privilege is not identified for the user, block 222, the access control system 130 sets an associated privilege bit to "0". The plurality of associated privilege bits for each user builds a privilege vector, block 224, for each user, respectively. The plurality of privilege vectors are placed in a column of the access control table such that a privilege vector is associated with each user.

For example, based on the sample data for the example Associated Application-Specific Access Control List, discussed above, the access control system 130 utilized with the IBM DB2 Digital Library, will generate an access control table identifying each user and the associated privilege vector for each user, as shown below.

| Logon User | Privilege Vector |
|---|---|
| User1 | V=<1, 0, 1, 0> |
| User2 | V=<0, 1, 0, 1> |
| User3 | V=<1, 0, 1, 0> |
| User4 | V=<1, 0, 1, 0> |

Based on the above example for an access control table, the access control system 130, in conjunction with the application program, can control the logic of whether to allow or restrict a user from accessing and performing a function upon a requested data item. For example, when User1 launches the application program, User1 is allowed to forward Multimedia data via E-Mail and to use workflow functions. User1 is not allowed to view video data nor can User1 access confidential data. On the other hand, User2 can view video data and access confidential information.

However, User2 does not have any Mail or Workflow privileges and therefore cannot forward Multimedia data via E-Mail or use workflow functions.

In a preferred embodiment of the access control system 130 of the present invention, an Object-Oriented Application Program Interface design is used to support the model for the access control system. The Object-Oriented Application Program Interface design provides a usable set of functions for application program developers to program their application-specific access control system directly into their application.

Application programs to interface with the digital library can use the following example of a C++ class. However, it should be appreciated that this C++ class is merely an example, and that other suitable C++ classes could also be used.

```
public class ApplicationSpecificAccessControl
{
ApplicationSpecificAccessControl(DKDatastoreDL*ds);
-ApplicationSpecificAccessControl();
public void defineVector(dkCollection privilege_list);
public void associate(DKAccessControlListDL acl);
public void deassociated();
public boolean isAuthorized(DKString privilege);
public void enable(dkCollection privilege_list);
public void disable(dkCollection privilege_list);
public void enableAll();
public void disableAll();
};
```

Brief Description of the Above C++ Class

ApplicationSpecificAccessControl(DKDatastoreDL*ds) This is the constructorto create an ApplicationSpecificAccessControl object. This method needs to know the pointer to a DKDatastoreDL object representing the Digital Library (DL) server.

-ApplicationSpecificAccessControl( ) This is the destructor of the class.

defineVector(dkCollection privilege_list) The function defines the application-specific definition vector to be used for privilege checking. This function implements blocks 200 and 202 of FIG. 3.

associate(DKAccessControlListDL acl) The function associates a particular Access Control List with this class. This function implements blocks 204 and 206 of FIG. 3.

deassociate( ) This function deassociates a particular Access Control List. The application can then associate itself with a different access control list.

isAuthorized(DKString privilege) The function will return a boolean value (for use in the privilege vector) indicating if the specified privilege is allowed or not.

enable(dkCollection privilege_list) This function enables a subset of privileges provided in the list for access control.

disabled(dkCollection privilegelist) This function disables a subset of privileges for access control.

enableAll( ) This function enables all the privileges defined by the defineVector function.

disableAll( ) This function disables all the privilege checking.

The Object-Oriented Application Program Interface design for the access control system 130 of the present invention provides a flexible way to manipulate application-specific access control to a digital library. The application program can associate and deassociate the Access Control List (ACL) to support the dynamic binding of the ACL. The application program can use "enable," "disable," "enableAll," and "disableAll" to control the application-specific privilege checking at run-time. The proposed access control system complements the system-level access control provided in most digital libraries, and particularly the IBM DB2 Digital Library, with an extensible application-specific access control system that is easily implemented with an Object-Oriented Application Program Interface design.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of controlling access by users to functions of an application executed by a computer connected to a datastore, the method comprising the steps of:
    for the application,
        associating one or more users with one or more application privileges wherein each application privilege is associated with a function; and
        restricting access by users to functions of the application dependent upon whether the user has been associated with the application privilege for the function.

2. The method of claim 1 above, further comprising the step of defining application privileges to control access to functions.

3. The method of claim 2 above, wherein the step of defining application privileges further comprises the step of building a definition vector.

4. The method of claim 3 above, further comprising the step of receiving a request to build the definition vector.

5. The method of claim 3 above, wherein the step of associating further comprises the step of associating an access control list with the definition vector.

6. The method of claim 5 above, further comprising the step of receiving a request to associate an access control list with the definition vector.

7. The method of claim 1 above, further comprising the step of checking the application privileges of the user utilizing a definition vector and an associated access control list.

8. The method of claim 7 above, wherein the step of checking further comprises the step of building a privilege vector.

9. The method of claim 8 above, wherein the privilege vector further comprises a plurality of privilege bits.

10. The method of claim 9 above, wherein the step of building a privilege vector further comprises setting a privilege bit if the application privilege for the user is identified in the associated access control list.

11. The method of claim 9 above, wherein the step of building a privilege vector further comprises not setting a privilege bit if the application privilege for the user is not identified in the associated access control list.

12. The method of claim 1 above, further comprising the step of building an access control table that defines the application privileges for a user.

13. The method of claim 12 above, further comprising the step of restricting the access of a user to a function based upon the access control table.

14. The method of claim 1 above, wherein one or more users comprises a group and wherein one or more application privileges are associated with a group.

15. An apparatus for controlling access by users to functions of an application, comprising:
    a computer having a datastore connected thereto;
    one or more computer programs, performed by the computer, and for the application, associating one or more users with one or more application privileges wherein each application privilege is associated with a function, and restricting access by users to functions of the application dependent upon whether the user has been associated with the application privilege for the function.

16. The apparatus of claim 15 above, further comprising means for defining application privileges to control access to functions.

17. The apparatus of claim 16 above, wherein the means for defining application privileges further comprises means for building a definition vector.

18. The apparatus of claim 17 above, further comprising means for receiving a request to build the definition vector.

19. The apparatus of claim 17 above, wherein the means for associating further comprises means for associating an access control list with the definition vector.

20. The apparatus of claim 19 above, further comprising means for receiving a request to associate an access control list with the definition vector.

21. The apparatus of claim 15 above, further comprising means for checking the application privileges of the user utilizing a definition vector and an associated access control list.

22. The apparatus of claim 21 above, wherein the means for checking further comprises means for building a privilege vector.

23. The apparatus of claim 22 above, wherein the privilege vector further comprises a plurality of privilege bits.

24. The apparatus of claim 23 above, wherein the means for building a privilege vector further comprises setting a privilege bit if the application privilege for the user is identified in the associated access control list.

25. The apparatus of claim 23 above, wherein the means for building a privilege vector further comprises not setting a privilege bit if the application privilege for the user is not identified in the associated access control list.

26. The apparatus of claim 15 above, further comprising means for building an access control table that defines the application privileges for a user.

27. The apparatus of claim 26 above, further comprising means for restricting the access of a user to a function based upon the access control table.

28. The apparatus of claim 15 above, wherein one or more users comprises a group and wherein one or more application privileges are associated with a group.

29. An article of manufacture comprising a computer program carrier readable by a computer and embodying one or more instructions executable by the computer to perform method steps for controlling access by users to functions of an application executed by the computer connected to a datastore, the method comprising the steps of:

for the application, associating one or more users with one or more application privileges wherein each application privilege is associated with a function; and restricting access by users to functions of the application dependent upon whether the user has been associated with the application privilege for the function.

30. The article of manufacture of claim 29 above, further comprising the step of defining application privileges to control access to functions.

31. The article of manufacture of claim 30 above, wherein the step of defining application privileges further comprises the step of building a definition vector.

32. The article of manufacture of claim 31 above, further comprising the step of receiving a request to build the definition vector.

33. The article of manufacture of claim 31 above, wherein the step of associating further comprises the step of associating an access control list with the definition vector.

34. The article of manufacture of claim 33 above, further comprising the step of receiving a request to associate an access control list with the definition vector.

35. The article of manufacture of claim 29 above, further comprising the step of checking the application privileges of the user utilizing a definition vector and an associated access control list.

36. The article of manufacture of claim 35 above, wherein the step of checking further comprises the step of building a privilege vector.

37. The article of manufacture of claim 36 above, wherein the privilege vector further comprises a plurality of privilege bits.

38. The article of manufacture of claim 37 above, wherein the step of building a privilege vector further comprises setting a privilege bit if the application privilege for the user is identified in the associated access control list.

39. The article of manufacture of claim 37 above, wherein the step of building a privilege vector further comprises not setting a privilege bit if the application privilege for the user is not identified in the associated access control list.

40. The article of manufacture of claim 29 above, further comprising the step of building an access control table that defines the application privileges for a user.

41. The article of manufacture of claim 40 above, further comprising the step of restricting the access of a user to a function of the application based upon the access control table.

42. The article of manufacture of claim 29 above, wherein one or more users comprises a group and wherein one or more application privileges are associated with a group.

43. The method of claim 1, wherein said access is restricted by dynamically binding the application to said one or more application privileges.

44. The method of claim 2, wherein a developer of the application defines said application privileges.

45. The method of claim 2, wherein a system manager of the application defines said application privileges.

46. The method of claim 2, wherein a user of the application defines said application privileges.

47. The method of claim 3, wherein said definition vector includes indicators associated with the application privileges, wherein the number of indicators is not limited by an access control system of the datastore.

48. The method of claim 4, wherein the definition vector includes at least one application-specific privilege.

49. The apparatus of claim 18, wherein the definition vector includes at least one application-specific privilege.

50. The article of manufacture of claim 32, wherein the definition vector includes at least one application-specific privilege.

* * * * *